Patented Feb. 4, 1936

2,029,959

UNITED STATES PATENT OFFICE 2,029,959

PROCESS OF WATER PURIFICATION

Oliver M. Urbain, Columbus, Ohio, assignor to Charles H. Lewis, Harpster, Ohio

No Drawing. Application July 28, 1934, Serial No. 737,472

3 Claims. (Cl. 210—2)

This invention relates to a process for removing or eliminating certain objectionable organic compounds from water, which compounds are present in the water in solution.

Specifically, the invention contemplates the removal of organic compounds belonging to the following three groups, i. e., group 1 including amines, group 2 including cyclic amides, and group 3 including hydroxy compounds.

All of these organic compounds tend to pollute and destroy the purity of water in which they are present. Their elimination or removal is essential to an efficient purification process. In accordance with the present invention, the compounds are either removed by reacting therewith other compounds to form insoluble addition products or eliminated by reaction to form unobjectionable soluble compounds.

The reagents employed in the present process are one of what I term the "isocyanate group." This term is defined for the purpose of this invention as including the members of that group of compounds characterized in that there is present in each member a chain of three atoms, the center atom of which has two double bonds attached to it.

Examples of the reagent are as follows:—

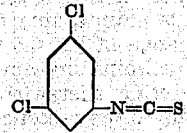
3.5—dichlorophenyl isothiocyanate

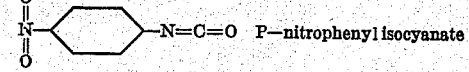
P—nitrophenyl isocyanate

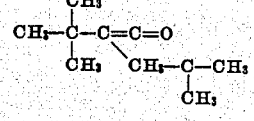
di-tert-butylketone

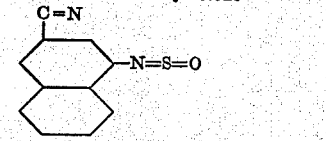
3-cyano-N-sulfinyl-1-naphthylamine

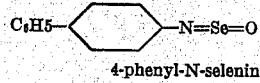
4-phenyl-N-seleninylaniline

As illustrative of the character of the amines that it is the purpose of the process to remove, the following general formula and definition is given:—

$$\text{General formula is } \begin{array}{c} R \\ | \\ R'\!-\!N \\ | \\ R'' \end{array}$$

R represents a hydrocarbon radical unsubstituted or substituted by any group or groups including the NH$_2$ group which may be substituted or unsubstituted. R' and R" may be H atoms, or one may be an H atom and the other a hydrocarbon radical either unsubstituted or substituted, or they may be both hydrocarbon radicals either unsubstituted or substituted. Or, R and R' may be a cyclic hydrocarbon radical, either substituted or unsubstituted, and R" may be hydrogen or a hydrocarbon radical either substituted or unsubstituted.

The amines are eliminated or removed as addition products. Both the primary and secondary amines, that is, those amines under the above definition that still have two and one hydrogen atoms respectively attached to the N atom will react with the "isocyanate group" reagent above identified. As stated, the reactions are addition reactions.

An example employing a primary amine is as follows:—

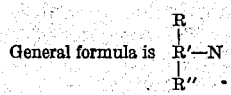
propylamine 3.5-dichlorophenyl isothiocyanate

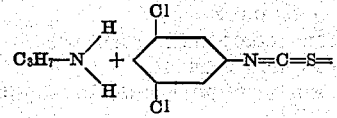
α-3.5-dichlorophenyl-β-propylthiourea

An example of the reaction employing a secondary amine is as follows:—

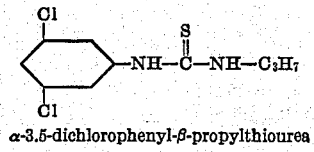
dibutylamine p-nitrophenyl isocyanate

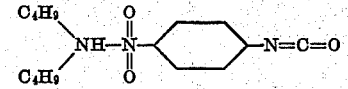

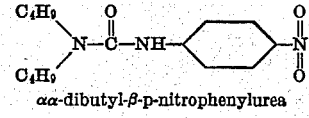
αα-dibutyl-β-p-nitrophenylurea

The pH of the reaction medium should not be over about pH 7.3.

Certain types of catalysts speed up these reactions. The following are effective: tertiary amines, cyclic amines, such as pyridine, quinoline, isoquinoline and quinaldine or their salts.

As illustrative of the character of the cyclic amines that it is the purpose of the process to eliminate or remove, the following general formula and definition is given:—

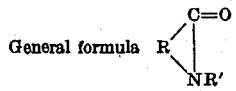

General formula

R = a cyclic hydrocarbon residue or radical unsubstituted or substituted by any group or groups including the

 group

R' = either hydrogen or a hydrocarbon radical either unsubstituted or substituted by any group or groups. The reagents of the "isocyanate group" react with the cyclic amides. An example of the reaction is as follows:—

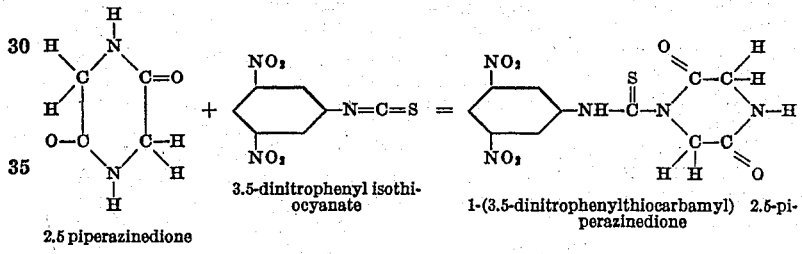

2,5 piperazinedione    3,5-dinitrophenyl isothiocyanate    1-(3,5-dinitrophenylthiocarbamyl) 2,5-piperazinedione These reactions take place in either a neutral solution or an acid solution but advantageously at a pH around 7.0.

As illustrative of the character of the hydroxy compounds that it is the purpose of the process to eliminate or remove, the following general formula and definition is given:

General formula R(OH)$_x$

R = hydrocarbon radical either unsubstituted or substituted by any group or groups.

X = one (1) or more.

The hydroxy compounds react well with the "isocyanate group" reagent.

The reaction medium should be slightly acid or neutral, advantageously around pH 7.0. An example is as follows:

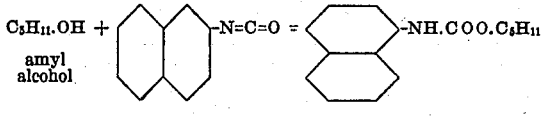
amyl alcohol    1-naphthyl isocyanate    amyl 1-naphthelenecarbomate

If compounds of all three of the groups i. e., amines, cyclic amides, and hydroxy compounds are present in the water, the pH should be adjusted so that it is at or near the neutral point pH 6.5 to pH 7 and the required quantity of the reagent or reagents added in gram molecular equivalents. The solution should then be agitated for about five minutes and passed into a sedimentation basin wherein separation of the insoluble reaction products will occur. The reagents and the several compounds react mol for mol. The process is rendered quite simple due to the fact that it is possible to correlate the pH of the solution so that reactions between the reagent and the compounds of the three classes can take place within a relatively narrow pH range common to the reaction requirements for each of the compounds and the reagents of the class given.

Having thus described my invention, what I claim is:—

1. A process for eliminating amines, cyclic amides and hydroxy compounds from water comprising reacting therewith a reagent of the isocyanate group.

2. A process for eliminating amines, cyclic amides and hydroxy compounds from water comprising reacting therewith a reagent of the isocyanate group while maintaining the solution at a pH within the range of pH 6.5 to pH 7.5.

3. A process for eliminating amines from water comprising reacting therewith a reagent of the isocyanate group in the presence of a catalyst.

OLIVER M. URBAIN.